(12) United States Patent
Ford (10) Patent No.: US 6,481,745 B2
(45) Date of Patent: Nov. 19, 2002

(54) DRIVER AIR BAG MODULE HORN WITH IMPROVED ASSEMBLY AND FUNCTIONALITY CHARACTERISTICS

(75) Inventor: Brian C. Ford, Mt. Clemens, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/766,794

(22) Filed: Jan. 22, 2001

(65) Prior Publication Data

US 2002/0096865 A1 Jul. 25, 2002

(51) Int. Cl.$^7$ ............................................... B60R 21/22
(52) U.S. Cl. .................. 280/731; 200/61.54; 200/61.55
(58) Field of Search ............................ 280/731, 728.3; 200/61.54, 61.55

(56) References Cited

U.S. PATENT DOCUMENTS

| | | | |
|---|---|---|---|
| 4,594,486 A | * | 6/1986 | Noda ...................... 200/61.54 |
| 5,036,169 A | | 7/1991 | Sakane |
| 5,626,358 A | | 5/1997 | Ricks et al. |
| 5,738,369 A | | 4/1998 | Durrani |
| 5,767,466 A | | 6/1998 | Durrani |
| 5,775,728 A | * | 7/1998 | Niwa et al. .................. 280/731 |
| 5,992,874 A | * | 11/1999 | Sugiyama et al. ........... 280/731 |
| 6,050,597 A | | 4/2000 | Coleman |

FOREIGN PATENT DOCUMENTS

JP            406239241 A    8/1994

* cited by examiner

Primary Examiner—Eric Culbreth
(74) Attorney, Agent, or Firm—Markell Seitzman (57) ABSTRACT

A driver air bag module (22) having a cover (16), a cushion (12), an inflator (10), and a switch assembly (20) is disclosed. The switch assembly (20) is formed by a flat upper housing member (40), which is slideably coupled to a generally flat lower member (42). A pair of electrical contacts (43, 44) is disposed therein and is coupled to the generally flat lower member (42). The switch assembly (20) is coupled to an inflator (10) and incorporated into the air bag cushion (12).

20 Claims, 8 Drawing Sheets

DRIVER AIR BAG MODULE HORN WITH IMPROVED ASSEMBLY AND FUNCTIONALITY CHARACTERISTICS

BACKGROUND AND SUMMARY OF THE INVENTION

This invention generally relates to motor vehicle air bags. More particularly, the invention relates to a driver side air bag module having an integral horn switch, which is easily and reliably actuated.

A driver side air bag module is typically mounted upon a motor vehicle's steering wheel. A typical module includes a mounting plate or housing attached to the hub of the steering wheel, an inflator mounted to the mounting plate, an air bag and a cover. The prior art teaches that horn switches can be placed within spokes of the steering wheel. The placement of this type of horn switch can be bothersome because it is difficult to install in the steering wheel, is not aesthetically pleasing, and it is often difficult for the driver of the vehicle to find and activate the horn. Several other designs have incorporated various horn mechanisms into the air bag module. One class of vehicle modules is floated on a spring assembly within a steering wheel assembly relative to a fixed, externally mounted horn switch, also mounted on the steering wheel. An electrical contact of the horn switch is placed on both the module and the wheel. To actuate the horn, the entire module is moved toward the steering wheel hub, closing the contacts and activating the horn. This method of horn switch design is expensive and requires a large gap between the module and the steering wheel so the module can float.

Another problem with floating horns/modules is that they are susceptible to vibration because the weight of the module must be supported by the springs. As a result, large springs must be used to avoid inadvertent actuation during vibration, jolt, bounce, etc., which in turn leads to high forces and displacements to activate the horn.

Another type of horn switch mounts a thin, flexible membrane switch on the back or inner surface of the air bag module cover. Membrane switches conventionally comprise two very thin non-conductive sheets having conductive coatings separated by thin spacers. Pressure on the switch moves the conductive surfaces together to close an electrical circuit and actuate the horn. The membrane switches are expensive and their installation is labor intensive. In the case of a malfunction of the horn switch, the entire cover must be replaced, as the membrane switch is an integral part of the cover.

Membrane horns have adequate appearance and actuation properties, but they also have problems with inadvertent horn actuation. This is typically caused when the air bag cushion is not folded properly (or expands over time), placing undo pressure on the membrane. In other instances, extreme hot or cold temperatures can cause the cover to expand or contract, which activates the member switch causing the horn to actuate.

Automotive horns contained in air bag modules have also proven extremely difficult to manufacture because of the stringent requirements placed on them. These include specific requirements on the force and displacement used to activate the horn, appearance, and resistance to inadvertent activation due to vibration.

It is the object of the present invention to eliminate these concerns. In the preferred embodiment, the horn switch consists of six components: a lower housing, upper housing, lower contact, upper contact, an optional wave spring, a wiring harness, and an adhesive disk. Activation of the horn occurs when the upper contact touches the lower contact, completing an electrical circuit.

It is a further object of the invention to provide an air bag module with a reliable horn switch, which allows for a module of reduced size. Other objects, features, and advantages will become apparent from the following description and appended claims.

Accordingly the invention has a driver side air bag module having an air bag cover, mounting plate, retaining ring, inflator, and cushion. The driver side air bag module cover includes a relatively flexible horn actuation area, which is depressible from its front surface by a driver. A horn switch assembly is provided inside the air bag module. The horn switch assembly is disposed on the inflator and is mounted behind the horn actuation area. This horn switch is electrically coupled to the horn by means of a wire harness, which passes through the inner diameter of the retaining ring and through the mounting plate. When the flexible horn actuation area is depressed, the horn switch couples the contacts and the electrical connection is made, which activates a horn.

Further areas of applicability of the present invention will become apparent from the detailed description provided hereinafter. It should be understood, however, that the detailed description and specific examples, while indicating the preferred embodiments of the invention, are intended for the purpose of illustration only, since various changes and modifications within the spirit and scope of the invention will become apparent to those skilled in the art from this detailed description.

DETAILED DESCRIPTION OF THE DRAWINGS

Reference is made to the drawings, wherein the showings are for the purpose of illustration of the preferred embodiments of the invention only and not for the purpose of a limitation.

Figure 1:
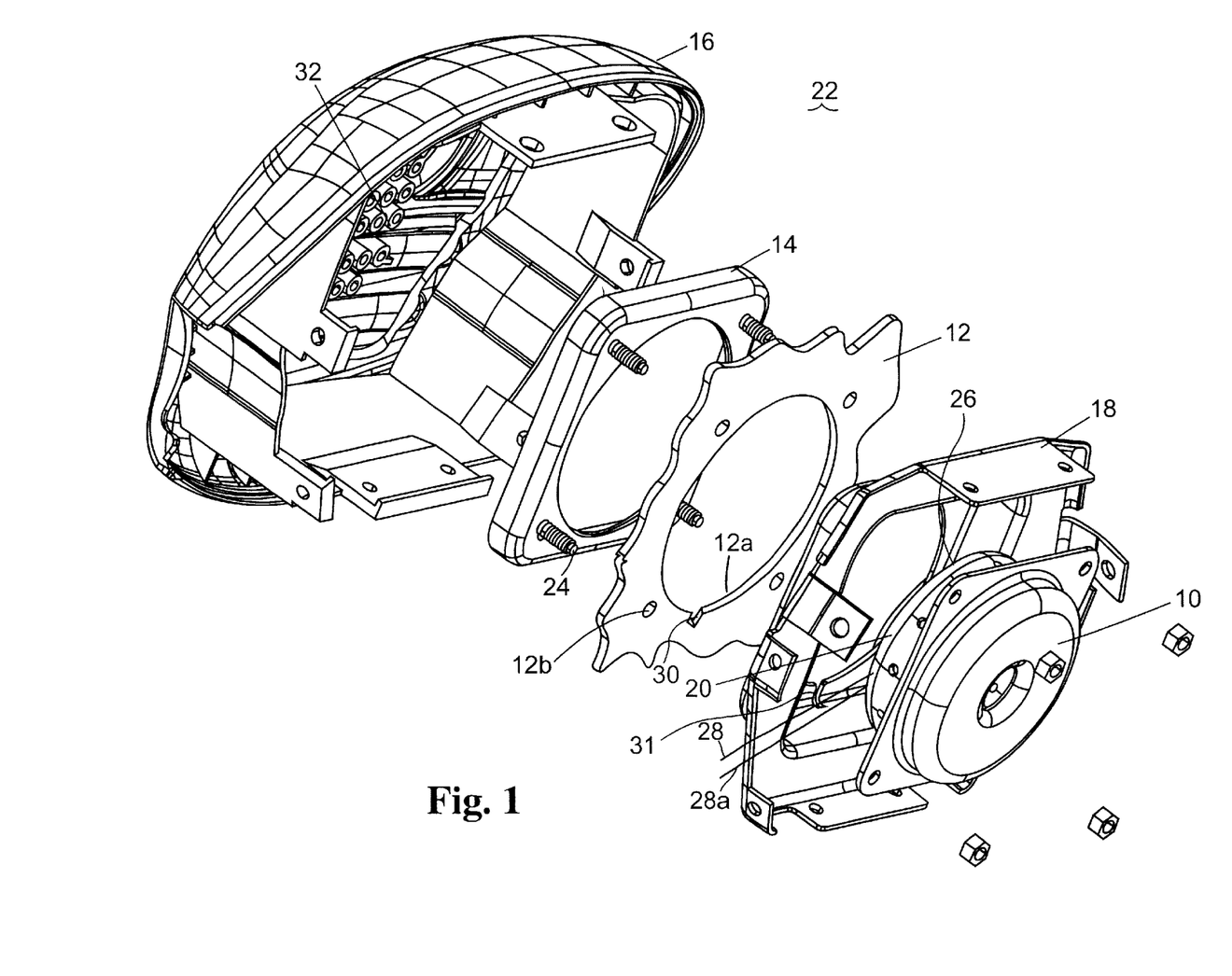
FIG. 1 is an exploded view of the driver air bag module according to the current invention.
Figure 2:
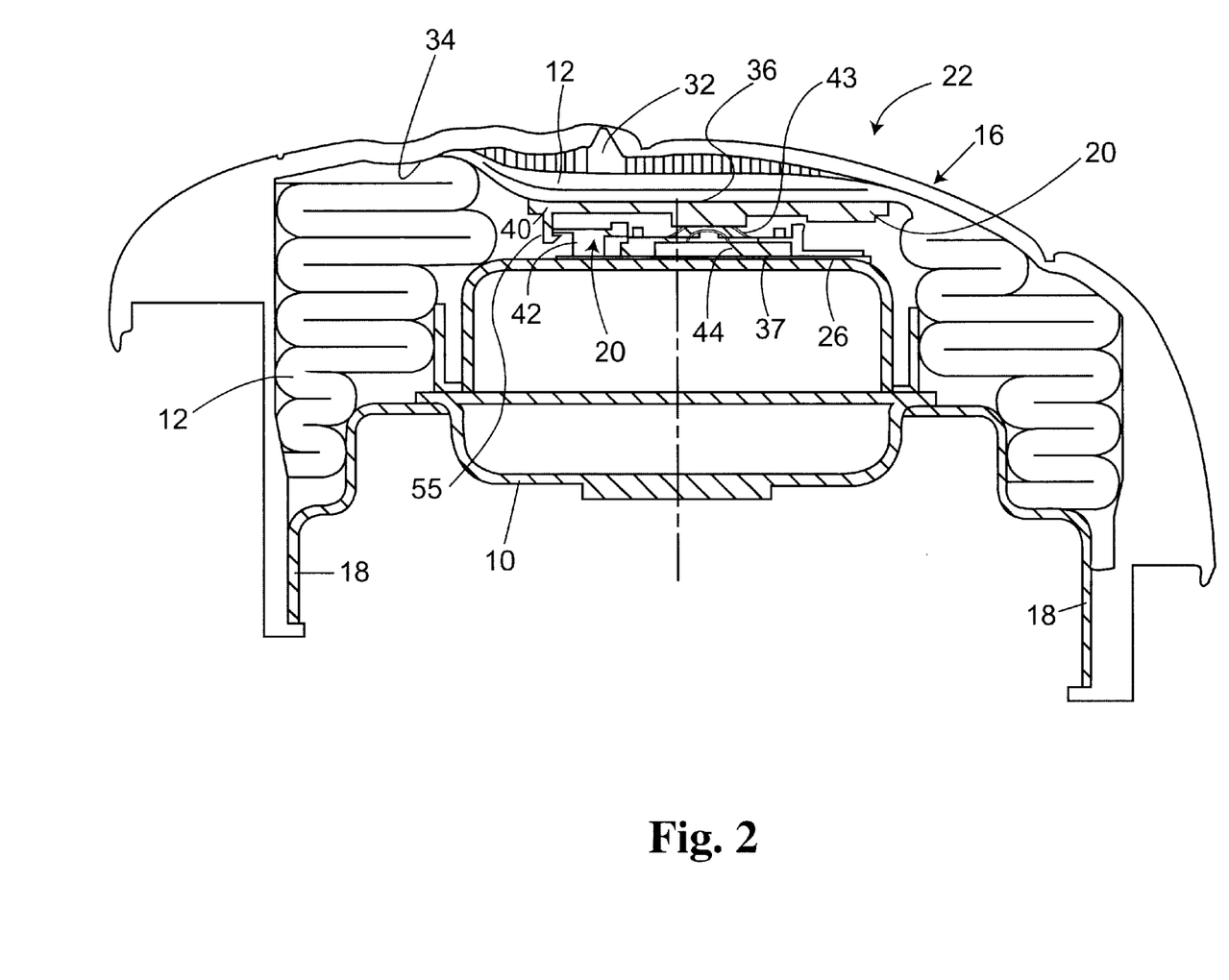
FIG. 2 is a cross section of the driver air bag module.

As shown in FIG. 1, the present invention comprises an air bag module 22 having six primary components: an inflator 10, a cushion 12, a retaining ring 14, a cover 16, a mounting plate 18, and a horn switch assembly 20, which form an air bag module 22. The air bag module 22 is assembled by placing the retaining ring 14 within an opening 12a in the neck of the cushion 12 (the air bag is only partially shown) so that the threaded studs 24 contained on the retaining ring 14 pass through its corresponding openings 12b. The horn switch assembly 20 is mechanically or adhesively bonded to an upper surface 26 of the inflator 10 as seen in FIG. 2. A pair of wires 28, 28a from the horn switch assembly 20 is passed through the opening 12a of the air bag. An optional aperture or notch 30 can be provided in the cushion 12 for the wires. The wires will be passed through a slot 31 in the mounting plate 18 to electrically connect the horn switch assembly to a wiring harness.

After the cushion 12 (with the retaining ring therein) has been folded, the studs of the retaining ring are passed through openings in the mounting plate. These parts are mounted onto the cover 16 and then the inflator 10 and horn switch assembly 20 is fixedly attached to the mounting plate 18 by connecting it to the threaded studs 24 of the retaining ring 14. As is known, an optional layer of Tyvek® or shrink wrapped polymer can be wrapped around the cushion 12 after it is folded to prevent contaminants from entering the cushion. As best seen in FIG. 1, the cover 16 includes a tear-seam 32 located on the underside of the top of the center of cover 16 allowing the cushion 12 to deploy therethrough in the event of a crash.

FIG. 2 shows a cross section of the module 22. The cover 16 is fixedly attached to the mounting plate 18 by snaps or rivets, as is known in the art. The horn switch assembly 20 of this embodiment is adhesively coupled to the upper surface 26 of the inflator 10. Disposed between the inside surface 34 of the cover 16 and the upper surface 36 of the horn switch assembly 20 is the air bag cushion 12. As shown in FIG. 2, it is preferred that a controllable amount of fabric be disposed between the upper surface 36 of the horn switch assembly 20 and the inner surface 34 of the cover 16. Although several layers of fabric from the cushion 12 can be tolerated, it is preferable to have as few layers as practical. The more layers of fabric there are, the less sensitive the horn is, and the greater the chance the folds will cause inadvertent actuation of the horn switch assembly 20.

Figure 3:
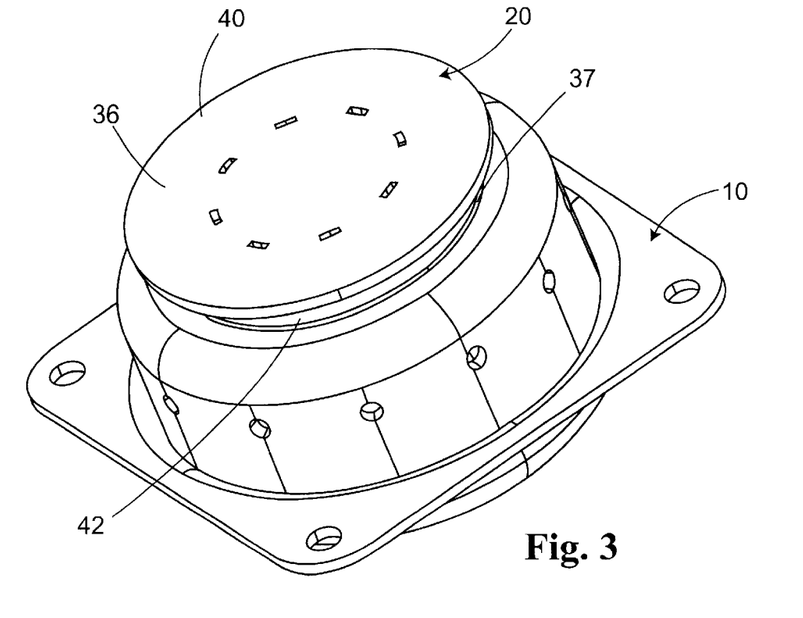
FIG. 3 is an inflator having the horn switch assembly.
Figure 4:
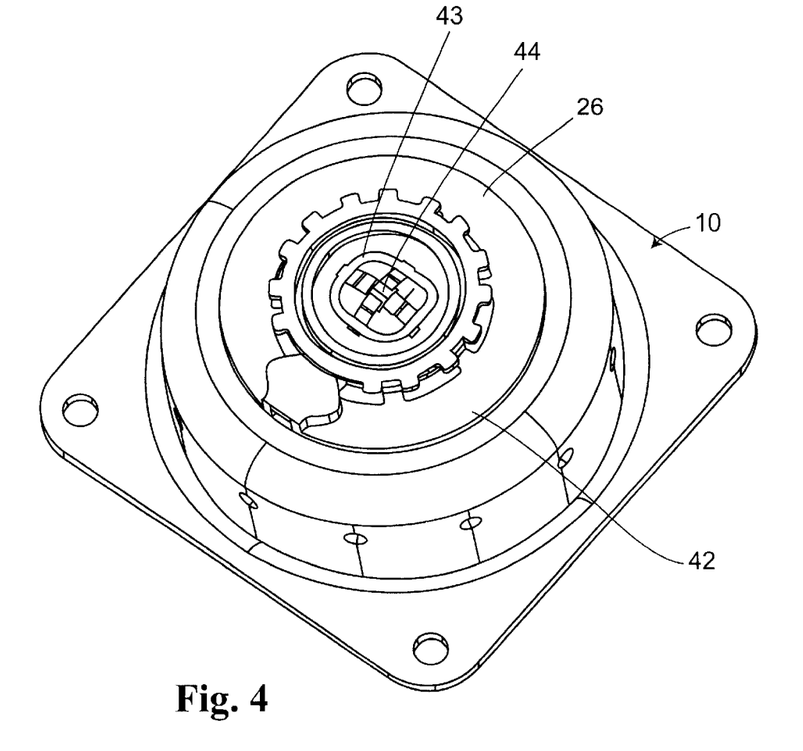
FIG. 4 is an inflator having the lower housing assembly of the horn switch of the current invention.

FIG. 3 shows the inflator 10 of FIG. 1 with the horn switch assembly 20 mounted thereon. The horn switch assembly 20 can be coupled to the inflator 10 by an adhesive pad 37. An exemplary way of mechanically fixing the horn assembly to the inflator is discussed later. As also detailed in FIGS. 4 and 5, the assembly 20 has an upper 40 and lower 42 housing with upper and lower electrical contact components 43 and 44 disposed therebetween.

When the inflator 10 is installed in the module 22 (and the horn with it), the problem of an irregularly folded cushion is no longer as severe. This is because the horn switch assembly 20 is slightly smaller in diameter than the inflator 10, forcing the cushion (air bag) material away from the horn switch assembly 20.

The problem of vibration causing inadvertent horn actuation is also drastically reduced because of the way the horn is installed. This is because the weight of the few layers of fabric above the horn is negligible compared to the weight of the entire module that must be countered by a floating horn. This means that the spring force for the horn can be minimized because a vibration needed to cause activation is much more severe than in a conventional floating horn.

Figure 5:
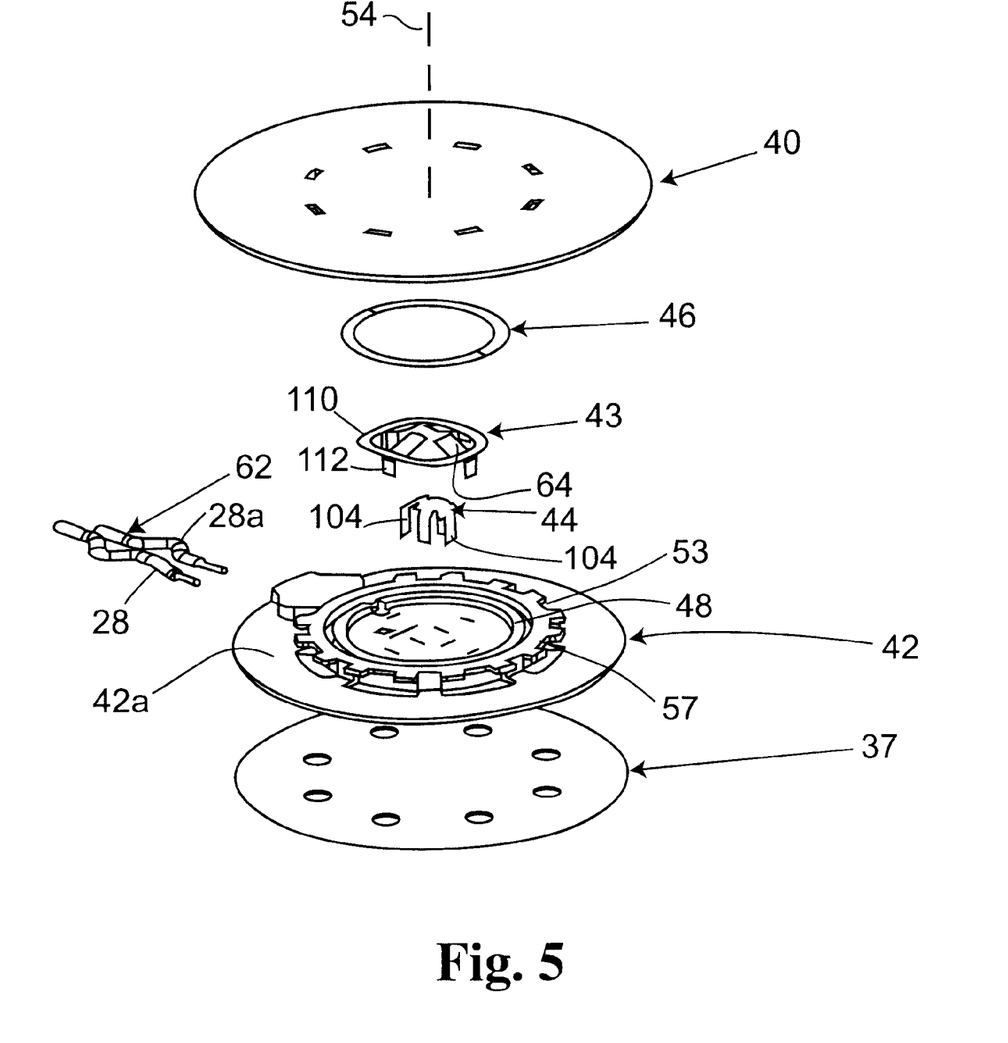
FIG. 5 is an exploded view of the horn switch assembly of the current invention.
Figure 6:
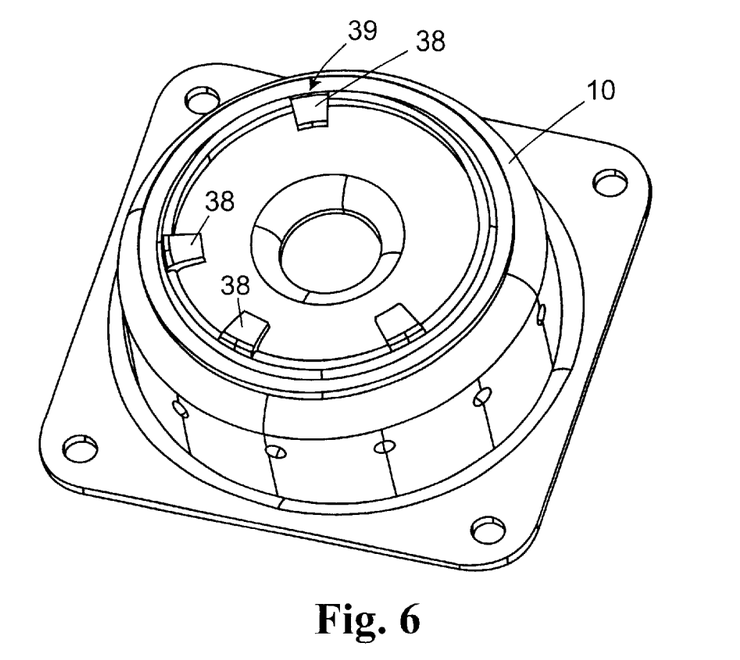
FIG. 6 is a top view of an inflator containing an alternative attachment feature.

FIG. 5 shows an exploded view of the horn switch assembly. Shown is the upper housing member 40, lower housing member 42, and a double-sided adhesive pad 37 for mounting the horn switch assembly 20 to the inflator 10.

Disposed between the upper 40 and lower 42 housings, are upper 43 and lower 44 contacts and, optionally, a biasing wave spring 46. The upper and lower contacts are secured to the lower housing 42. When used, see FIG. 5, the wave spring 46, which is seated on a first ridge member 48 formed onto the lower housing 42, functions to additionally bias the upper housing 40 away from the lower housing 42. The wave spring increases the force that must be applied to activate the horn, as may be required for some applications.

Figure 7:
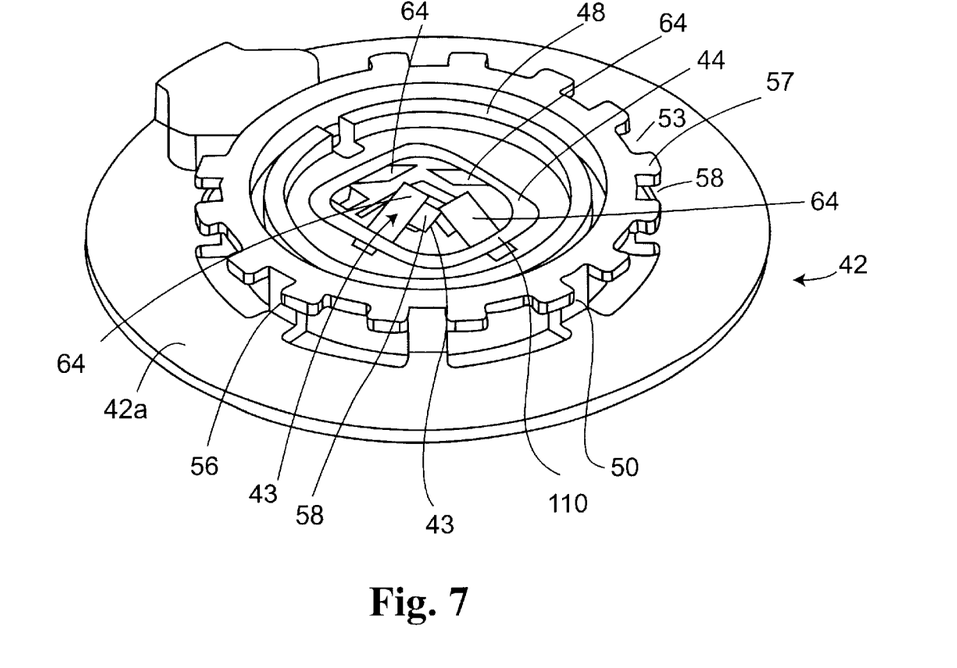
FIG. 7 is a top perspective view of the lower housing of the horn switch assembly of the current invention.

As best seen in FIGS. 5 and 7, the lower housing has a first annular wall 56, which can be segmented, and which supports an upper latching ring or shelf 57 above the base 42a of the lower housing 42. The upper latching shelf 57 has a plurality of notches 53 disposed therein for accepting a plurality of latching tab members 55 disposed on the undersurface of the upper housing 40. The latching shelf 57 functions to provide a location for, and to apply radial pressure to the latching tab members 55 of the upper housing (see FIGS. 9 and 9a) to snap onto so that the upper 40 and lower 42 housings are held together.

The upper 40 and lower 42 housings slideably engage each other to allow movement along a first axis 54 (see FIG. 5). The wall tolerances of the latching tab members 55 and the notches 53 prevent the upper 40 and lower 42 housing from moving radially with respect to each other. Axial movement of the upper 40 and lower 42 housing with respect to each other causes the upper 43 and lower 44 contacts to engage and electrically close the circuit, activating the horn.

Figure 8:
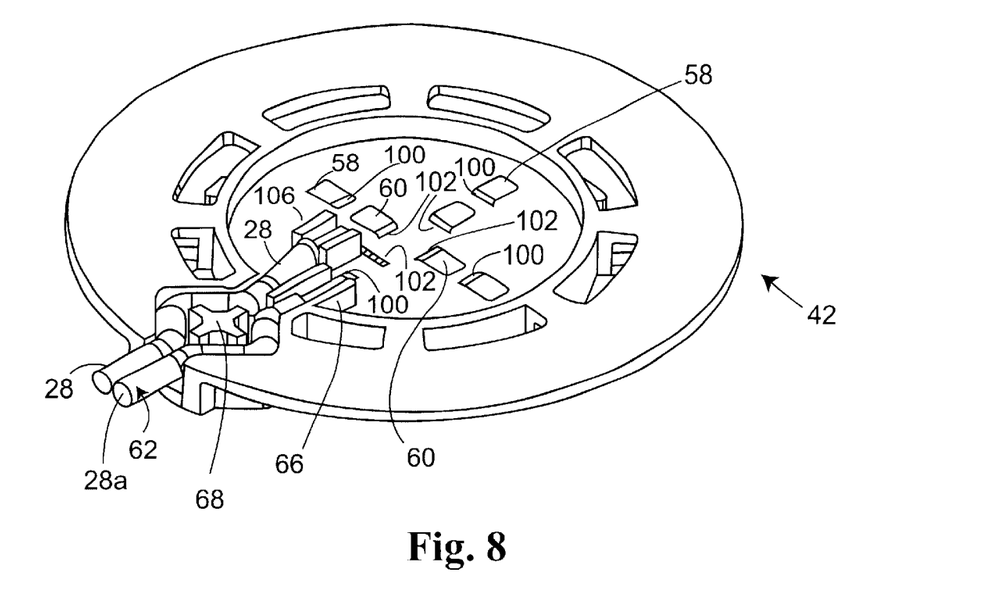
FIG. 8 is a bottom perspective view of the lower housing of the horn switch assembly of the current invention.

As best seen in FIGS. 7 and 8, the lower housing 42 has a pair of walled structures or grooves 66 and 106 for slideably receiving a wire of the wire harness. These grooves 66 function to hold the wire harness 62 in a fixed location with respect to the lower housing 42, allowing for the soldering of the wires 28, 28a to the upper and lower contacts 43 and 44. The wire coupling portion further has an integral strain relief 68 molded therein.

The lower housing 42 assembly has disposed therein a first set of slots 100 and a second set of slots 102 for respectively receiving ends of the upper and lower electrical contacts. As best seen in FIGS. 5, 7 and 8, the lower contact 44 has four flexible legs 104. The ends of each leg form a tab portion 60 that is passed through one of the slots 102 and bent over. One of the tabs is captured between a walled structure 106 to facilitate attachment to one of the wires 28. Radially disposed about and above the lower contact 44 is the upper contact 43. The upper contact 43 includes a ring 110 and four, flexible upper contact members 64. Extending downwardly from the ring are four legs 112, the ends of each leg forming a corresponding tab 58 mounted onto the lower housing 42. Each of the tabs 58 is received through one of the slots 100 and bent over. One of the foldable tabs 58 is received within another walled structure 66, which functions as a connecting location with a second wire 28a of the wiring harness. The four upper contact members 64 are angled above the lower contact 44 and also function to apply spring bias forces on the upper housing 40 to separate the lower housing from the upper housing 40.

When a force is applied to the surface 36 of the upper housing 40, the underside 52 of the upper housing 40 applies a force to the upper contact members 64. The upper contact members 64 are then elastically depressed into the lower contacting members 58, thus completing the electrical circuit. When the force on the upper surface 99 of the upper housing 40 is removed, the upper contact members 64 function as a leaf spring, separating the upper 43 and lower 44 contacts and upper 40 and lower 42 housings, thus disconnecting the upper 43 and lower 44 contacts. As mentioned above, a wave spring 46 may be added to the assembly to increase the effective spring constant and assist in separating the upper 43 and lower 44 contacts and upper 40 and lower 42 housings.

Figure 9:
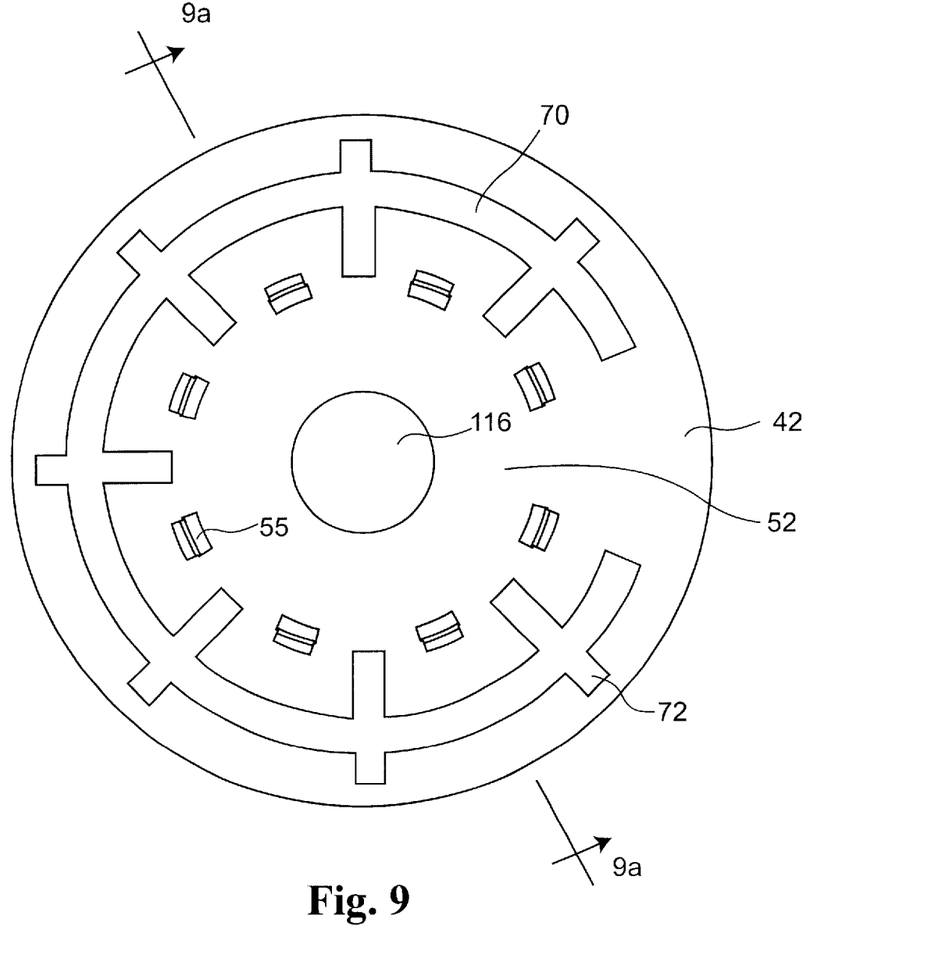
FIG. 9 is a bottom view of the upper housing of the current invention.
Figure 9A:
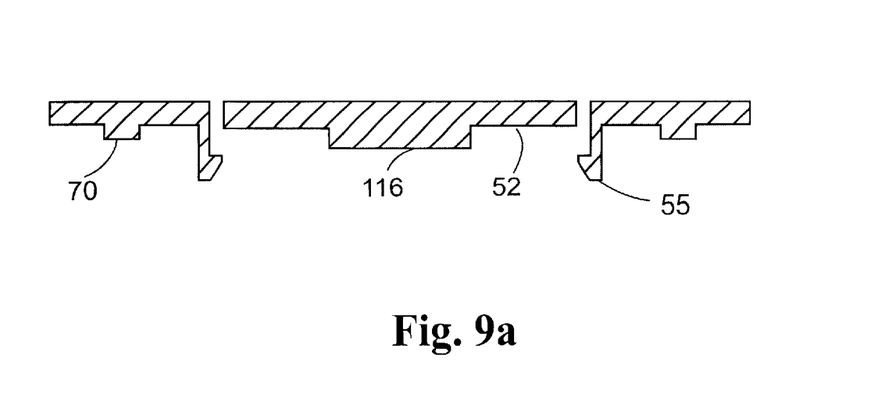
FIG. 9a is a cross-sectional view through section 9a—9a of FIG. 9.

FIG. 9 is a bottom view of the upper 40 housing. Shown is the plurality of latching tab members 55 (also shown in FIG. 9a), which mate with the notches in the upper shelf 57 of the lower housing 42. Also shown is a support ring 70 with radiating flange members 72. These radiating flange members 72 and support ring 70 serve to stiffen the upper housing 40. The support ring 70 is configured so as to not interfere with the coupling region of the wire harness in the lower housing 42 or with the upper shelf portion 57 of the lower housing 42. The stroke of the switch assembly is limited by length of the latching tab members 55, the boss 116 and by the upper shelf 57 of the lower housing 42. Upon full depression of the switch member, the support shelf 57 of the lower housing 42 engages the under side 52 of the upper housing 40. The underside 52 also includes the central extending boss 116, which engages the upper contact members 64.

Figure 10:
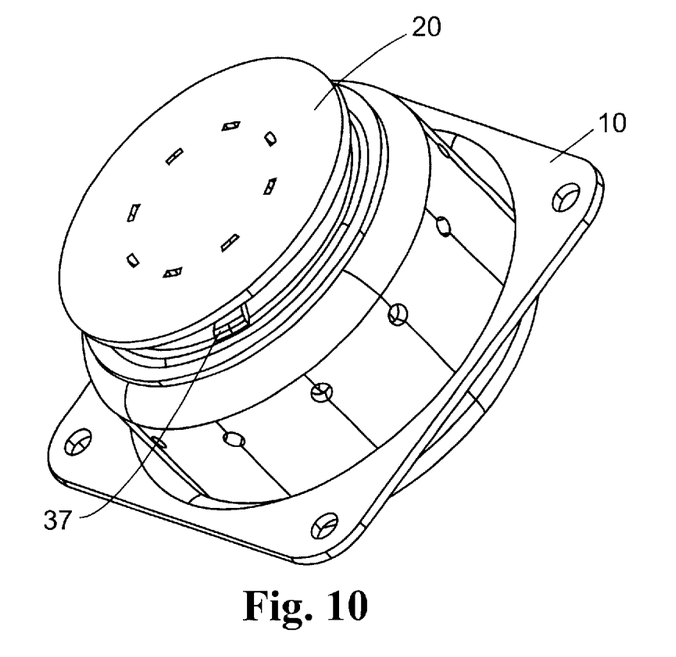
FIG. 10 is a top view of the alternative horn mechanism set in place on top of the inflator.
Figure 11:
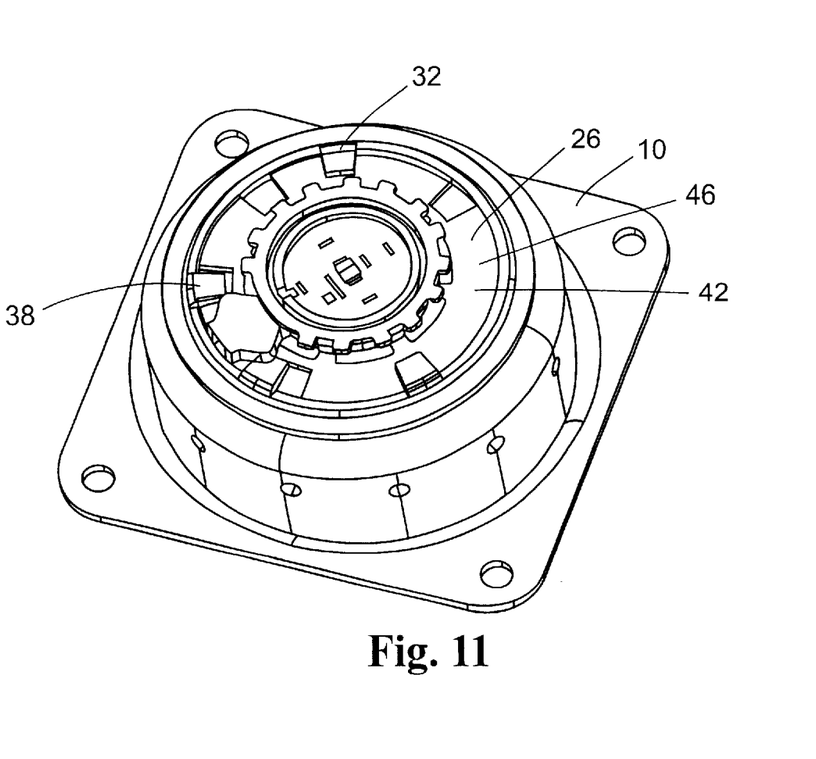
FIG. 11 is a top view of the horn mechanism rotated into the attached position with the horn switch upper housing removed for clarity.
Figure 12:
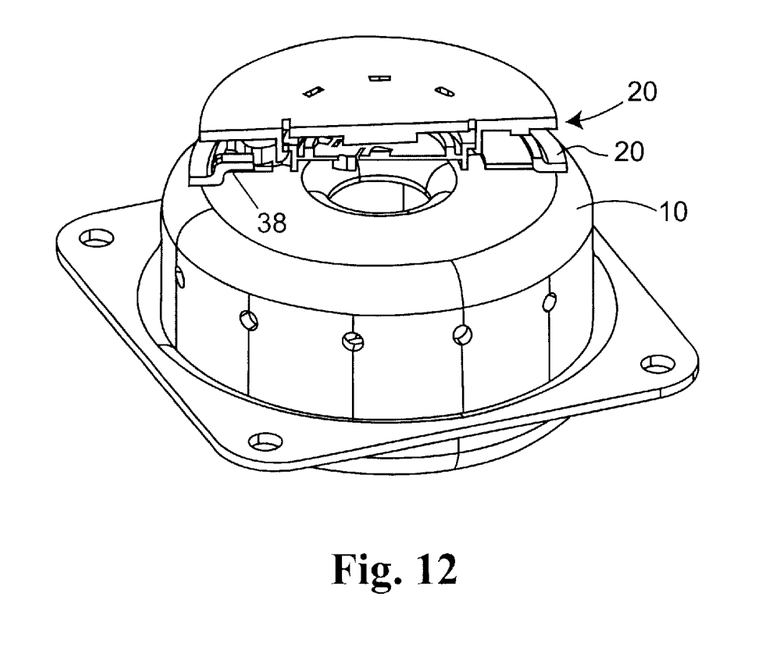
FIG. 12 is a cross-sectional view of the alternative horn design in the attached position.

Reference is made to FIGS. 6 and 10–12, which disclose an alternate embodiment in which the lower housing 42 lockably engages with the inflator rather than using the adhesive as described above. More particularly, the lower housing 42 engages with the mechanical locking member 39 disposed on inflator 10. The locking member 39 has a plurality of inwardly directed teeth 38, which are used to engage the lower housing 42 of the horn switch assembly 20. The locking teeth 38 (and slots) are indexed to allow for the proper orientation of the horn switch assembly 20 onto the inflator assembly 10. The slots on the lower housing 42 are aligned with a corresponding tooth and the lower housing forced down toward the inflator. The lower housing 42 is rotated moving each slot out of alignment with its tooth 38 as shown in FIG. 11. FIG. 10 shows the horn assembly 20 in position on inflator 10. FIG. 12 shows a partial cross-sectional view of the assembly 20 in engagement with one of the teeth 38.

A method for producing an air bag module is further described below, the method of air bag module 22 assembly includes the steps of: providing an air bag cover 16, mounting plate 18, retaining ring 14, inflator 10, cushion 12, and switch assembly 20. The switch assembly 20 is coupled to the surface of the inflator 10 by applying a layer of double-sided adhesive 37 or by a mechanical connection. A retaining ring 14 is placed within the cushion 12 and the cushion 12 is coupled to a mounting plate 18. The inflator 10 and switch assembly 20 is disposed within the cushion 12, and the wires 28 to the wire harness are fed through the hole or slot 30 in the center of the air bag 12, and through a notch 31 extending from the hole in the center of the mounting plate 18. The cushion 12 is then folded about the inflator-switch subassembly and the mounting plate 18 is fixedly attached to the air bag cover 16.

A wide variety of features can be utilized in the various air bag modules discussed and described above. The foregoing discussion discloses and describes a preferred embodiment of the present invention. One skilled in the art will readily recognize from such discussion, and from the accompanying drawings, that various changes, modifications, and variations can be made therein without departing from the true spirit and fair scope of the invention.

What is claimed is:

1. A driver side air bag module (22) having a switch assembly (20) comprising:
    an upper housing member (40); and
    a lower housing member (42) disposed adjacent said upper housing member (40), having a lower (44) and upper (43) electrical contact disposed thereon
    and wherein the upper electrical contact includes a ring and a plurality of support legs which engage the lower housing member and a plurality of flexible contact tabs each of which are directed inwardly of the ring to contact the lower electrical contact.

2. The module as defined in claim 1 wherein the lower electrical contact includes a first portion located below the ring and a plurality of support legs extending from the first portion.

3. A driver side air bag module (22) having a switch assembly (20) comprising:
    an upper housing member (40); and
    a lower housing member (42) disposed adjacent said upper housing member (40), having a lower (44) and upper (43) electrical contact disposed thereon;
    wherein the upper member has a plurality of snap attachment features (55) arranged in a circular pattern, and said lower member (42) has a shelf (57) having a like plurality of notches arranged in a circular pattern and capable of engaging said snap features.

4. The module (22) as defined in claim 3 further comprises a wave spring (46) disposed between said upper (40) and lower (42) housing members.

5. A driver side air bag module (22) having a cover (16), a cushion (12), an inflator (10), and a switch assembly (20), said switch assembly (20) comprising:
    an upper housing member (40); and
    a lower housing member (42) disposed adjacent said upper housing member (40), having a lower (44) and upper (43) electrical contact disposed thereon;
    wherein said switch assembly (20) is disposed on said inflator (10).

6. The module as defined in claim 5 wherein the switch assembly includes a first and a second contact.

7. The module (22) as defined in claim 5 wherein the switch assembly is coupled with a wire harness (62) of the vehicle.

8. A driver side air bag module (22) having a cover (16), a cushion (12), an inflator (10), and a switch assembly (20), said switch assembly (20) comprising:
    a first housing member (40); and
    a second housing member (42) disposed adjacent said first housing member (40), having a switch operatively connected between the first and second housing members;
    wherein said switch assembly (20) is disposed on said inflator (10) and wherein the switch assembly includes a first and a second contact;
    wherein the first and the second contact include an upper and a lower contact and wherein said upper (43) and lower (44) contacts have a plurality of connecting flanges (58, 60) for mechanically coupling the upper (43) and lower (44) contacts to said second housing member (42).

9. The module (22) as defined in claim 8 wherein the connecting flanges (58, 60) are capable of electrically coupling the upper and lower contacts (58, 60) to a wire harness (62).

10. A driver side air bag module (22) having a cover (16), a cushion (12), an inflator (10), and a switch assembly (20), said switch assembly (20) comprising:

a first housing member (40); and a second housing member (42) disposed adjacent said first housing member (40), having a switch operatively connected between the first and second housing members;

wherein said switch assembly (20) is disposed on said inflator (10);

wherein the switch assembly (20) is disposed within said cushion (12).

11. The air bag module (22) as defined in claim 10 wherein there is a predetermined thickness of fabric disposed between the switch assembly (20) and the cover (16).

12. A horn switch assembly (20) for an air bag module (22) comprising:

a generally flat upper housing member (40);

a generally flat lower housing member (42) disposed adjacent said upper member; and a lower and upper electrical contact (44, 43) disposed between said upper (40) and lower (42) members and wherein said upper electrical contact (43) acts as a spring assembly disposed between said upper (40) and lower (42) housing members for biasing said upper (40) and lower (42) housing members apart;

and wherein the upper electrical contact includes a ring and a plurality of support legs which engage one of the housing members and a plurality of flexible contact tabs each of which are directed inwardly of the ring wherein each of the contact tabs is a spring member.

13. The module as defined in claim 12 wherein the lower electrical contact includes a first portion located below the ring and a plurality of support legs extending from the first portion.

14. A horn switch assembly (20) for an air bag module (22) comprising:

a generally flat upper housing member (40);

a generally flat lower housing member (42) disposed adjacent said upper member; and a lower and upper electrical contact (44, 43) disposed between said upper (40) and lower (42) members and wherein said upper electrical contact (43) acts as a spring assembly disposed between said upper (40) and lower (42) housing members for biasing said upper (40) and lower (42) housing members apart;

wherein the lower housing member (42) has a shelf (57) with a plurality of notches arranged in a circular pattern and said upper housing member (40) has a plurality of locking tabs (55), arranged in a circular pattern for engaging the notches of the shelf (57).

15. The air bag module as defined in claim 14 wherein said shelf (57) is generally circular and wherein said upper (43) and lower (44) contact members are disposed within said shelf (57).

16. The air bag module (22) as defined in claim 15 wherein the shelf is annular in shape and wherein said upper electrical contact (43) is located within the annulus of said shelf.

17. A method for producing an air bag module (22) assembly comprising the steps of:

(a) providing an air bag cover (16), a mounting plate (18), an inflation means (10), an air bag cushion (12), and a switch assembly (20);

(b) mounting said switch assembly (20) on said inflation means (10).

18. The method as defined in claim 17 including the step of:

(c) mounting said cushion (12) on said inflator (10) wherein the switch assembly (20) is disposed within said cushion (12).

19. A driver side air bag module (22) having a cover (16), a cushion (12), an inflator (10), and a switch assembly (20), said switch assembly (20) comprising:

a first housing member (40); and a second housing member (42) disposed adjacent said first housing member (40), having a switch operatively connected between the first and second housing members;

wherein said switch assembly (20) is disposed on said inflator (10);

wherein the switch assembly is connected to a top surface of the inflator.

20. The module (22) as defined in claim 19 wherein the switch assembly is disposed between the top surface of the inflator and an inside surface of the cover.

* * * * *